US008694834B2

(12) United States Patent  (10) Patent No.: US 8,694,834 B2
Thompson  (45) Date of Patent: Apr. 8, 2014

(54) PREVENTING LOG WRAP WITH DEBUG SCRIPTS

(75) Inventor: Robert Wright Thompson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 545 days.

(21) Appl. No.: 12/956,814

(22) Filed: Nov. 30, 2010

(65) Prior Publication Data

US 2012/0137181 A1    May 31, 2012

(51) Int. Cl.
    G06F 11/00    (2006.01)
(52) U.S. Cl.
    USPC ............................................. 714/45
(58) Field of Classification Search
    USPC .......................... 714/45, 48; 713/1
    See application file for complete search history.

(56) References Cited

U.S. PATENT DOCUMENTS

| | | | |
|---|---|---|---|
| 6,463,552 B1* | 10/2002 | Jibbe | 714/33 |
| 6,671,818 B1* | 12/2003 | Mikurak | 714/4.21 |
| 7,343,534 B2 | 3/2008 | Meaney et al. | |
| 7,360,111 B2 | 4/2008 | Adya et al. | |
| 7,913,194 B1* | 3/2011 | Baylor | 716/122 |
| 2002/0107809 A1* | 8/2002 | Biddle et al. | 705/59 |
| 2007/0179931 A1* | 8/2007 | Juby et al. | 707/2 |
| 2008/0126828 A1* | 5/2008 | Girouard et al. | 714/2 |
| 2009/0216869 A1* | 8/2009 | Kennedy | 709/223 |
| 2011/0320884 A1* | 12/2011 | Thilagar et al. | 714/48 |

OTHER PUBLICATIONS

Vetter, et al; AIX Version 4.3 Differences Guide; International Technical Support Organization; Oct. 1999; International Business Machines Corporation.
Anonymous; Script Debugger 4.5; Late Night Software.
Stadlbauer; Scripting Qt; Qt Quarterly; Trolltech; http://doc.trolltech.com/qq/qq10-scripting-qt.html.
Larkin, Using NCCS Cray XT4 System; Cray Inc.
Schreiber, Andreas; Automatic Generation of Wrapper Code and Test Scripts for Problem Solving Environments; Computer Science; Jun. 2004; vol. 3732/2006.
Stadlbauer, Reginald; Scripting QT; http://doc.trolltech.com/qq/qq10-scripting-qt.html; Trolltech, Dec. 2004.
Foley, Richard; Perl Debugger Pocket Reference; Because No One Writes Perfect Code; O'Reilly; Jun. 15, 2005.

* cited by examiner

*Primary Examiner* — Yair Leibovich
(74) *Attorney, Agent, or Firm* — Arthur Samodovitz; Robert C. Rolnik

(57) ABSTRACT

A shell debug application avoids loss of debug log data for configured commands during the operation of an operating system. A shell debug application executes a command shell script, by a computer, to control an amount of code path debug data captured in memory buffers and saved. The shell debug application obtains, by the computer, a configuration file that includes at least one command. The shell debug application runs the command shell script in the configuration file in response to detection of at least one script associated with the at least one command in the configuration file.

21 Claims, 4 Drawing Sheets

FIG. 6

| SHELL DEBUG APPLICATION 601 |
| COMMAND SHELL 603 |
| OPERATING SYSTEM 605 |
| PHYSICAL RESOURCES 607 |

PREVENTING LOG WRAP WITH DEBUG SCRIPTS

BACKGROUND

1. Technical Field

The present invention relates generally to a computer implemented method, data processing system, and computer program product for data processing system debugging. More specifically, the present invention relates to dynamically modifying logging details.

2. Description of the Related Art

Information technology staff of a manufacturer or system integrator provides support for data processing systems of varying configurations. Some data processing systems are grown by replacing parts as well as replacing subsystems as they become obsolete. A consequence of system installs, upgrades, and software refinement is that some configurations can be unstable. As a result, an error can develop which may be identified by a customer.

Commands given on a data processing system can produce output in several forms. Typically, certain errors are expected and can be classified in advance with their status be written out to output. A log is the data structure to which errors and other status information is stored. Some logs have defined sizes because they are allocated a portion of memory or disk space. Log data is information concerning the operation of one or more processes, and can include both errors as well as statistics and other information concerning operations of the data processing system.

An error is any detectable condition of a data processing system that operates below a user's expectations, below the manufacturer's expectations, or below nominal thresholds for which the data processing system is actually configured. For example, an error can be a tract of data that fails to match a parity check. An error can be a statistic that is above or below a pre-set threshold. An error can be a report made to a data processing system by a device outside of the data processing system, such as, for example, a 404 error response to a web-page query. Errors can be measured by time-outs, failed responses, and unexpected slowness, among other responses.

Commands and processes that instruct a data processing system how to manage a function can be executed in a way that triggers reporting of varying levels of system activity. In many cases, an initial report that is stored to a log is merely a symptom of an error. Rather than identify a person, device, or configuration that is a source or root cause, the initial report simply shows a degradation in data processing system performance. When such symptoms are noticed, the lack of an elevated level of detail by affected commands and processes can limit the retrospective look at system history and confound analysis of the source of the error.

SUMMARY

According to one embodiment, a method for avoiding loss of debug log data for configured commands during the operation of an operating system. A shell debug application executes a command shell script, by a computer, to control an amount of code path debug data is captured in memory buffers and saved. The shell debug application obtains, by the computer, a configuration file that includes at least one command. The shell debug application runs the command shell script in the command shell in response to detection of at least one script associated with the at least one command in the configuration file.

According to another illustrative embodiment, a method, computer program product and computer system to selectively enhance logging is disclosed. A computer receives a command. The computer determines whether the command is specified in a configuration file. The computer, responsive to determining that the command is specified in the configuration file, modifies a verbosity of logging that is performed in response to the computer executing the command. The computer executes the command.

According to another illustrative embodiment, a computer program product has one or more computer-readable, tangible storage devices and computer-readable program instructions which are stored on the one or more storage devices. When executed, the program instructions configure a data processing system to receive a command. The program instructions configure a data processing system to determine whether the command is specified in a configuration file. The program instructions configure a data processing system to modify a verbosity of logging that is performed in response to the computer executing the command, responsive to determining that the command is specified in the configuration file. The program instructions configure a data processing system to execute the command.

According to another illustrative embodiment, a computer system comprising one or more processors, one or more computer-readable memories, one or more computer-readable, tangible storage devices and program instructions is disclosed. The program instructions, which are stored on the one or more storage devices for execution by the one or more processors via the one or more memories, can be executed by the one or more processors to receive a command. The program instructions can be executed by the one or more processors to determine whether the command is specified in a configuration file. The program instructions can be executed by the one or more processors to modify a verbosity of logging that is performed in response to the computer executing the command, responsive to determining that the command is specified in the configuration file. The program instructions can be executed by the one or more processors to execute the command.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 is a description of the relationship between hardware and software components in accordance with an illustrative embodiment of the invention.

DETAILED DESCRIPTION

Figure 1:
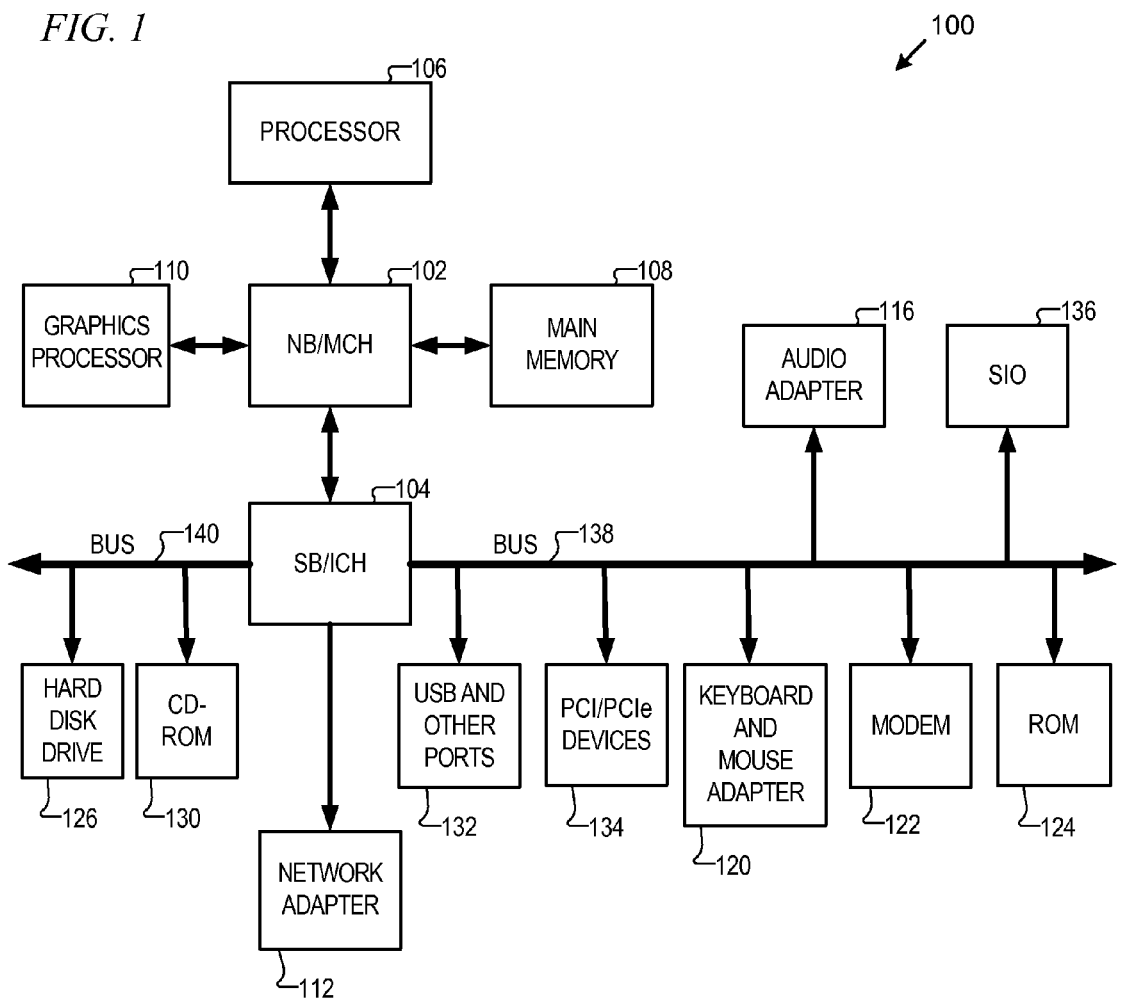
FIG. 1 is a block diagram of a data processing system in accordance with an illustrative embodiment of the invention.

With reference now to the figures and in particular with reference to FIG. 1, a block diagram of a data processing system is shown in which aspects of an illustrative embodiment may be implemented. Data processing system 100 is an example of a computer, in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 connect to north bridge and memory controller hub 102. Graphics processor 110 may connect to the NB/MCH through an accelerated graphics port (AGP), for example.

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 104 through bus 138 or bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106, and coordinates and provides control of various components within data processing system 100 in FIG. 1. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 100. Java is a trademark or registered trademark of Oracle Corporation and/or its affiliates in the United States, other countries, or both.

Instructions for the operating system, the object-oriented programming system, and applications or programs are located on at least one of one or more computer readable tangible storage devices, such as, for example, hard disk drive 126, or CD-ROM 130, for execution by at least one of one or more processors, such as, for example, processor 106, via at least one of one or more computer readable memories, such as, for example, main memory 108, read only memory 124, or in one or more peripheral devices.

Those of ordinary skill in the art will appreciate that the hardware in FIG. 1 may vary depending on the implementation. Other internal hardware or peripheral devices, such as flash memory, equivalent non-volatile memory, and the like, may be used in addition to or in place of the hardware depicted in FIG. 1. In addition, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus, and a PCI bus. Of course, the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1 is not meant to imply architectural limitations. For example, data processing system 100 also may be a tablet computer, laptop computer, or telephone device in addition to taking the form of a PDA.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention is presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) storage device(s) may be utilized. A computer readable storage device may be, for example, but not limited to, an electronic, magnetic, optical, electromagnetic, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible device that can store a program for use by or in connection with an instruction execution system, apparatus, or device. The term "computer-readable storage device" does not encompass a signal propagation media such as a copper cable, optical fiber or wireless transmission media.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
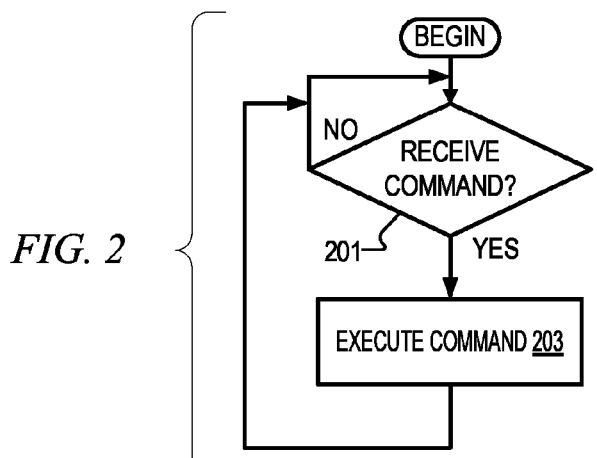
FIG. 2 is a block diagram of a prior art command shell.

FIG. 2 is a block diagram of a prior art command shell. A command shell is an application or process executed on a data processing system to provide an interface for users of operating system functions. As such, the command shell enables a user, or scripts that the user accesses, to obtain services of a kernel to the data processing system. The command shell provides a command line for entering commands that are interpreted and executed. Syntax of commands and command shell scripts permit for sequential and conditional operation of commands and other command shell scripts. A command shell script is a file containing commands and syntax of a command shell. Types of command shells include Korn shells (ksh), Bourne again shells (bash), 'C' shells (csh) and the like. A command is an instruction of an operating system program or utility that corresponds to a string in the command line or script, together with any associated options, reserved words, i/o direction, and the like that satisfy the syntax of the command shell. A command may be entered to the command line. A command line is a user interface that permits a user to interactively edit a command before committing it to the operating system for execution. Although a command can be entered in a single line of text, a command can be placed on multiple lines if a connecting character, for example the backslash ('\') within AIX operating systems, indicates that the syntax and processing should occur using at least two consecutive lines.

The command shell repeatedly iterates to determine if it received a command (step 201). If no command is received, the command shell repeats execution of step 201. Otherwise, in response to a command arriving, the command shell, executed by the data processing system, executes the command (step 203). A command is described as being received when it arrives from a terminal that is physically connected to the data processing system or reaches the data processing system via intermediate networking equipment to remotely access the command shell.

Figure 3:
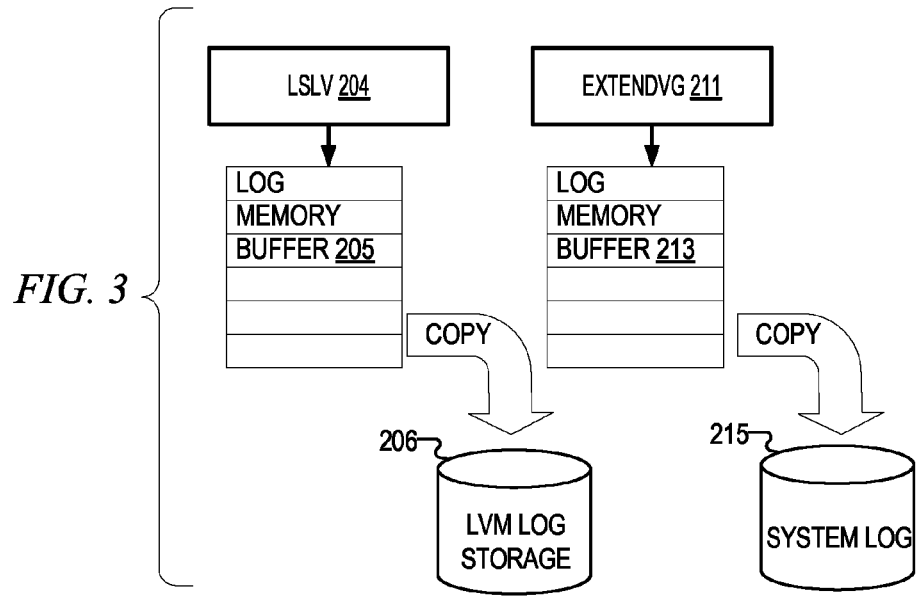
FIG. 3 is a block diagram illustrating the interaction between a command, a log buffer, and archived logs in accordance with an illustrative embodiment of the invention.

FIG. 3 is a block diagram illustrating the interaction between a command, a log buffer, and archived logs in accordance with an illustrative embodiment of the invention. Two AIX commands, "lslv" and "extendvg," are given as examples. Any other command from an operating system could also apply. Lslv command 204 is allocated log memory buffer 205 which can be limited in size. Lslv command 204 is a command available in AIX to determine characteristics and status of a logical volume or list the logical volume allocation map. Similarly, extendvg command 211 is allocated log memory buffer 213, which is also limited in size. Extendvg command 211 is a command that increases the size of volume group by adding one or more physical volumes.

A logical volume is a virtual device presented to the operating system as a real physical volume. A map called the logical volume allocation map is used to take operations on the virtual device and translate those operations to the real physical volumes hidden by the map. A logical volume management command is a command to create, access or modify a logical volume. The logical volume management command is interpreted by the command shell and is used to read and execute the corresponding instructions that may be stored in a file having the name 'lslv'. The instructions execute using at least the processor of the data processing system, in accordance with methods and limitations of the operating system, for example AIX.

Both lslv command 204 and extendvg command 211 send information to their own logical volume log, such as logical volume log storage 206, and also to a system tracing log, such as system tracing log 215. Each command in the operating system can use its own log or a log utility provided by the operating system. For instance, some commands use the syslog utility provided by AIX for logging code paths being accessed during program execution. The embodiment can allow the use of any system utility or individual command logging utilities by any programmer since the scripts in the configuration file, referred to below in FIG. 4, can use commands for any logging utilities. Commands in these scripts can start logging, end logging, cause data in memory to be copied to physical storage, increase the verbosity or detail of the logging, etc. all of which can improve the needed capture of data.

Figure 4:
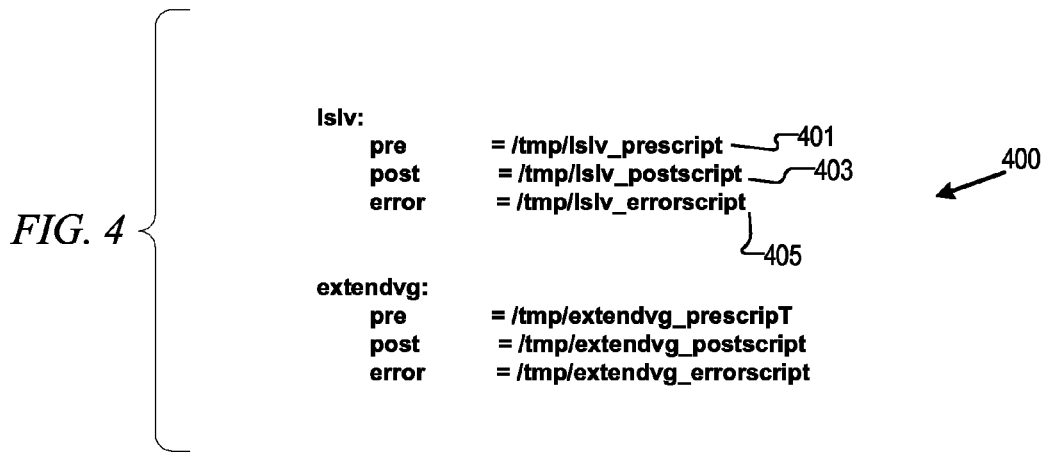
FIG. 4 is a configuration file in accordance with an illustrative embodiment of the invention.

FIG. 4 is a configuration file in accordance with an illustrative embodiment of the invention. Configuration file 400 is a file that can identify one or more commands selected for enhanced review. A configuration file such as configuration file 400 may associate each command with at least one of three scripts, namely, a pre-script, a post command script and an error script. A script is a file written using instructions native to the operating system as well as commands installed on a data processing system on which the operating system is installed. The data processing system can execute commands of a script by interpreting a line, converting the line to machine instructions, and dispatching the machine instructions to a processor.

In configuration file 400, a simple syntax allows a command to be coupled to one or more scripts by following each command with a colon (':'). It is appreciated that the configuration file may rely on many other pre-selected characters as a signal that a command is coupled to one or more scripts. Moreover, many alternative formats, such as XML and semicolon-separated lines, may establish relationships between commands and one or more scripts.

Configuration file 400 couples /tmp/lslv_prescript 401 to a command, namely, lslv, as a pre-script. Configuration file 400 couples /tmp/lslv_postscript 403 to lslv as a post command script. Configuration file 400 couples /tmp/lslv_errorscript 405 to lslv as an error script. Each file name may be designated as pre-script, post command script or error script using reserved words, respectively, "pre", "post", and "error". It is appreciated that many other alternative reserved words can be used to identify the role and timing of executing each script.

Figure 5:
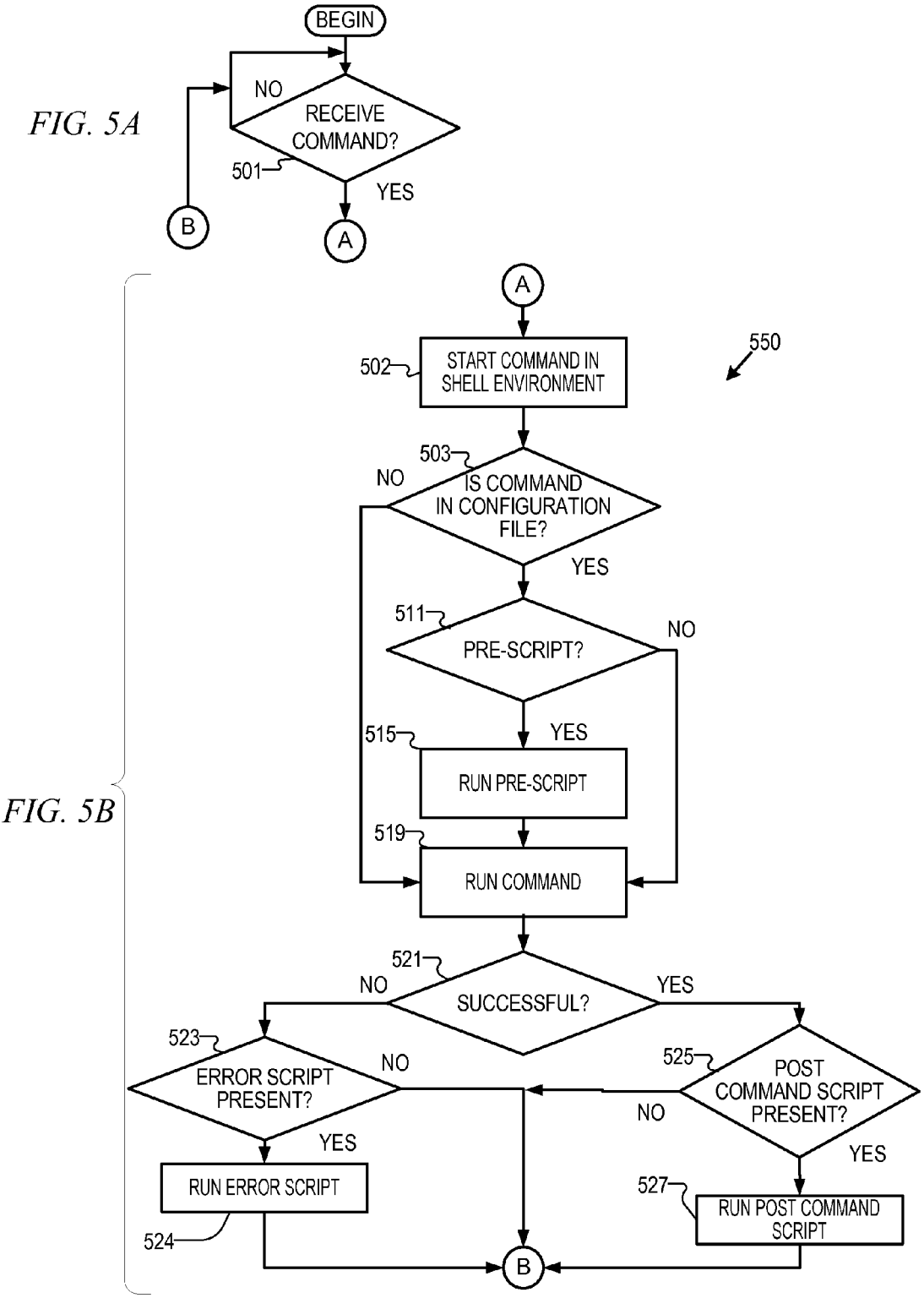
FIG. 5A is a command shell front-end application to a shell debug application in accordance with an illustrative embodiment of the invention.
FIG. 5B is a shell debug flowchart in accordance with an illustrative embodiment of the invention.

FIG. 5A is a command shell front-end application to a shell debug application in accordance with an illustrative embodiment of the invention. Initially, the shell debug application determines whether a command is received (step 501). If no command is received, the shell debug application repeats execution of step 501.

FIG. 5B is a shell debug flowchart in accordance with an illustrative embodiment of the invention. Steps of flowchart 550 are executed after a positive result to step 501, above. Initially, the shell debug application starts a command in a shell environment (step 502). Step 502 can include parsing the command. In other words, the command is loaded to memory, and the shell debug application may associate values with environment variables present in the command.

Next, the shell debug application can determine if the command is in a configuration file (step 503). A configuration file can be, for example, configuration file 400 of FIG. 4. In other words, as part of step 503, the shell debug application can obtain or otherwise open the configuration file. In response to a negative determination, the shell debug application can run the command (step 519). On the other hand, if the command is in the configuration file, the shell debug application can determine if the command is coupled to a pre-script (step 511). If no pre-script is coupled to the command, the shell debug application runs the command at step 519. However, if a pre-script is coupled to the command, for example, by use of the "pre" reserved word, the shell debug application runs the pre-script (step 515).

A pre-script is a script that increases verbosity in connection with a command with which the pre-script is associated. Verbosity, or the verbose setting of a command, is a measure of volume and detail that a command or script is set to record, for example, in a log, in relation to status and errors. A low verbose setting (low verbosity) can indicate that only entry conditions and exit conditions for the main loops of a program execution are recorded. In contrast, a high verbose setting (high verbosity) can correspond to a status being recorded at every conditional statement to indicate the branch taken. Verbosity can be adjusted on a per-command basis. Verbosity may be described as a single digit from 0 to 9, inclusive. Each digit corresponds to a level of verbosity, where a "0" may signal no reporting of status and errors for the affected command, a "1" may signal the lowest volume and/or most limited reporting of status and errors for the affected command, and a "9" may signal the highest volume of reporting. A former level is any default level or level assigned to a shell command or script before the running of the pre-script. It is appreciated that other ranges, or even alpha-numeric sequences can be used to set relative levels of verbosity.

An example command in a pre-script to elevate verbosity of an lvmt log is as follows:

alog -C -t1 vmt -w 9

In data processing systems running an AIX operating system, the above example command will change the current verbosity, usually set to around 5, of the lvmt log to a higher verbosity of 9. In the syntax of the above example command, -C stands for change and -t stands for which predefined log.

The pre-script can modify logging performed with an execution of the command, for example, by increasing verbosity of a log to which the command records. As a manner of avoiding log wrap, the pre-script may set logging to exclude logging of query commands. An example of a query command is lslv.

As a result of the shell debug application running the pre-script (step 515), the command's internal operation may be better exposed. For example, increased verbosity of the log to which the command records can cause additional code path debug data to be collected in the log, as compared to a default verbosity setting. Code path debug data is data that indicates whether specific branches in machine instructions have been taken. Code path debug data can be used to determine whether branch statements executed, or alternatively, procedural code targeted by the branch statements executed, are candidates for being the cause of an error.

Next, the shell debug application may run the command at step 519. Next, the shell debug application determines whether the command completed successfully (step 521). In response to successful completion, the shell debug application determines whether a post command script file is associated with the command (step 525). If the post command script file is associated with the command, the shell debug application runs the post command script (step 527). The post command script can include a command to reduce verbosity, for example, of a log indicated by the command. An example of a command to lower verbosity is as follows:

alog -C -t lvmt -w 0

Among other exemplary functions of the post command script is the function of preserving log data. Log data is preserved by machine readable instructions of the post command script copying the log data from a memory buffer containing the log data and storing the log data to non-volatile storage, such as, for example, logical volume manager (LVM) log storage 206 and/or system log 215.

In response to the shell debug application running the post command script (step 527), the shell debug application determines whether additional commands are received (step 501). Similarly, following a negative determination at step 525, processing may resume at step 501. The step of running the command (step 519), in combination with any one of running a pre-script 515, running an error script 524, and running a post script 527 is known as adaptively executing the command. Adaptively executing includes, for example, making preparatory steps to adjust logging, as well as taking remedial steps after the command is run.

An unsuccessful execution of the command causes processing to pass from step 521 to step 523. Accordingly, the shell debug application may determine if an error script is associated with the command (step 523). If an error script is associated with the command, the shell debug application can trigger execution of the error script (step 524). The error script can log notification of an error in the command. The error script can cause present log data to be copied to a file with a time stamp and the command name which generated the error. This logging can avoid loss of data as can occur with log wrapping. Processing may resume determining whether additional commands are received at step 501. Similarly, following a negative determination at step 523, processing may resume at step 501.

FIG. 6 is a description of the relationship between hardware and software components in accordance with an illustrative embodiment of the invention. Shell debug application 601 may operate as a daemon or other long-running system process. Similarly, the command shell 603 may also operate as a daemon or other long-running system process. The term "running in the command shell" refers to shell debug application 601 calling command shell functions to execute each command including even the pre-script, post command script and error script. Each of shell debug application 601 and command shell 603 may be executed on one or more processors, for example, processor 106 of FIG. 1. Shell debug application 601 can operate relying on syntax interpretation of command shell 603, though shell debug application 601 can perform additional steps, such as running the pre-scripts, post command scripts and error scripts, described above. Similarly, command shell 603 can rely on utilities and operating system's 605 organized resources to carry out each command of a command shell script. The operating system's 605 more detailed instructions accomplish the low-level I/O, memory allocations, and other housekeeping and maintenance functions to allow each of shell debug application 601, command shell 603 and operating system 605 to carry out their assigned functions. Physical resources 607, as defined in FIG. 1, for example, memory such as main memory 108, storage such as hard disk drive 126 and CD-ROM 130, and processors such as processor 106, organize the data and make physical changes in the environment and work-pieces to complete the instructions of the other components in FIG. 6.

Shell debug application 601 can be tailored to trigger the collection of large volumes of trace data, where suspect commands are known in advance. Accordingly, commands that are mature and trusted, in a technician's judgment, may be unmodified in the verbosity of their status and error logging. Nevertheless, through identifying suspect commands in a configuration file, and correspondingly, coupling such commands to scripts that elevate logging for the command, targeted first error detection data can be increased for relevant commands, while not overwhelming the corresponding memory buffer to which command status' and errors are logged. In other words, the increment in status/error volume can be moderated so that log wrap does not occur in the memory buffer, and so that sufficient data is captured to permit thorough and rapid identification of defects in command coding.

The illustrative embodiments permit a command shell to interpret commands and provide specialized treatment for commands that are defined in a configuration file. The configuration file may define commands by the string used to invoke the command. Moreover, depending on scripts associated with each command, a command shell may increase or diminish verbosity of status and error reporting with which a command is requested to operate. Further adjustments can be made to the data processing system to enable tailored recording of log information, as well as archiving of such information, so that only those commands that a technician wants to reveal more detail actually reveals more detail. Accordingly, log wrap can be diminished as compared to prior art methods of logging system status' and errors.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable storage device providing program code for use by or in connection with a computer or any instruction execution system. For the purposes of this description, a computer-usable or computer readable storage device can be any tangible apparatus that can store the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or computer readable tangible storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for managing first and second log data recorded for first and second types of commands, respectively, the method comprising:
   a computer receiving user input specifying a first level of detail for the first log data recorded for the first type of command, the first level of detail differing from a second level of detail for the second log data recorded for the second type of command;
   the computer executing a command shell script in a command shell, the command shell script including the first and second types of commands;
   the computer executing one or more scripts to generate the first log data with the first level of detail during execution of the first type of command in the command shell script, and the second log data with the second level of detail during execution of the second type of command in the command shell script and wherein the first and second log data comprise first and second respective program code paths including first and second branch statements, respectively, executed by the computer executing leading to execution by the computer of the first and second commands, respectively.

2. The method of claim 1, wherein the first and second levels of detail specify respective first and second different sets of conditions at which status of the command shell script is recorded.

3. The method of claim 1, wherein the step of executing the one or more scripts comprises running a script after execution of the first type of command, wherein the script is described in a configuration file that associates the script to at least one of a first type of logical volume management command or a second type of logical volume management command.

4. The method of claim 1, further comprising:
   determining whether an error occurred when while running the first type of command; and
   responsive to a determination that an error occurred, running an error script in the command shell.

5. The method of claim 1, wherein the first type of command is a first type of logical volume management command, and the second type of command is a second type of logical volume management command.

6. The method of claim 1, wherein the first type of command is a first type of storage management command, and the second type of command is a second type of storage management command.

7. A method to selectively enhance logging, the method comprising:
   a computer receiving a first logical volume management command;
   the computer executing the first logical volume management command to generate a first level of detail of reporting;
   the computer determining whether a post command script pertains to the first logical volume management command in a configuration file;
   and subsequently, the computer receiving a second logical volume management command, and
   the computer, in response to receiving the second logical volume management command and determining that the post command script pertains to the first logical volume management command in the configuration file, executing the post command script to direct execution of the second logical volume management command to generate a second level of detail of reporting, wherein the first level of detail differs from the second level of detail.

8. The method of claim 7, wherein the computer receiving the first volume management command comprises the computer receiving the first volume management command from a command line interface.

9. A computer program product comprising one or more computer-readable storage devices and computer-readable program instructions which are stored on the one or more storage devices and when executed by one or more processors, perform the method of claim 7.

10. A data processing system comprising one or more processors, one or more computer-readable memories, one or more computer-readable, storage devices and program instructions which are stored on the one or more storage devices for execution by the one or more processors via the one or more memories and when executed by the one or more processors perform the method of claim 7.

11. The method of claim 7, wherein the computer executing the post command script comprises the computer preserving log data.

12. The method of claim 11, wherein the computer preserving log data comprises the computer copying a log memory buffer to storage.

13. The method of claim 11, wherein the computer preserving log data comprises the computer executing a third command to generate the first level of detail.

14. A computer program product to selectively enhance logging, the computer program product comprising: a computer readable storage device having computer readable program code stored thereon, the computer readable program code comprising:
   computer readable program code to receive a first logical volume management command associated with a first level of detail of reporting;
   computer readable program code to execute the first logical volume management command to generate the first level of detail of reporting;
   computer readable program code to determine whether a post command script pertains to the first logical volume management command in a configuration file;
   computer readable program code to subsequently receive a second logical volume management command, and the computer, in response to receiving the second logical volume management command and determining that the post command script pertains to the first logical volume management command in the configuration file, computer readable program code to execute the post command script to direct execution of the second logical volume management
   command to generate a second level of detail of reporting, wherein the first level of detail differs from the second level of detail.

15. The computer program product of claim 14, wherein computer readable program code to receive the first logical volume management command comprises computer readable program code to receive the first command from a command line interface.

16. The computer program product of claim 14, wherein computer readable program code to execute the post command script comprises computer readable program code to preserve log data.

17. The computer program product of claim 16, wherein computer readable program code to preserve log data comprises computer readable program code to copy a log memory buffer to storage.

18. The computer program product of claim 16, wherein computer readable program code to preserve log data comprises computer readable program code execute a third command to generate the first level of detail.

19. A computer system to selectively enhance logging, the computer system comprising:

one or more processors, one or more computer-readable memories and one or more computer-readable storage devices;

program instructions, stored on at least one of the one or more storage devices for execution by at least one of the one or more processors via at least one of the one or more memories, to receive a first logical volume management command associated with a first level of detail of reporting;

program instructions, stored on at least one of the one or more storage devices for execution by at least one of the one or more processors via at least one of the one or more memories, to execute the first logical volume management command to generate the first level of detail of reporting;

program instructions, stored on at least one of the one or more storage devices for execution by at least one of the one or more processors via at least one of the one or more memories, to determine whether a post command script pertains to the first logical volume management command in a configuration file;

program instructions, stored on at least one of the one or more storage devices for execution by at least one of the one or more processors via at least one of the one or more memories, to subsequently receive a second logical volume management command, and the computer, in response to receiving the second logical volume management command and determining that the post command script pertains to the first logical volume management command in the configuration file, computer readable program code to execute the post command script to direct execution of the second logical volume management command to generate a second level of detail of reporting, wherein the first level of detail differs from the second level of detail.

20. The computer system of claim 19, wherein program instructions, stored on at least one of the one or more storage devices for execution by at least one of the one or more processors via at least one of the one or more memories, to receive the first volume management command comprises program instructions, stored on at least one of the one or more storage devices, to receive the first volume management command from a command line interface.

21. The computer system of claim 19, wherein program instructions, stored on at least one of the one or more storage devices for execution by at least one of the one or more processors via at least one of the one or more memories, to execute the post command script comprises program instructions, stored on at least one of the one or more storage devices, to preserve log data.

* * * * *